United States Patent [19]
Cronin-Golomb et al.

[11] Patent Number: 5,018,801
[45] Date of Patent: May 28, 1991

[54] ACHROMATIC VOLUME HOLOGRAPHY APPARATUS

[75] Inventors: Mark Cronin-Golomb, Reading; Robert A. Gonsalves, Woburn, both of Mass.

[73] Assignee: Tufts University, Medford, Mass.

[21] Appl. No.: 531,623

[22] Filed: Jun. 1, 1990

[51] Int. Cl.$^5$ .................. G03H 1/04; G02F 1/03; G02B 5/18

[52] U.S. Cl. ............... 350/3.61; 307/425; 350/3.64; 350/162.15

[58] Field of Search .......... 350/3.61, 3.64, 3.7, 350/3.83, 162.15; 307/425

[56] References Cited

U.S. PATENT DOCUMENTS

| | | | |
|---|---|---|---|
| 4,550,973 | 11/1985 | Hufnagel | 350/3.7 |
| 4,703,992 | 11/1987 | Yeh | 350/3.64 |
| 4,773,719 | 9/1988 | Anderson et al. | 350/3.64 |
| 4,786,124 | 11/1988 | Stone et al. | 350/3.7 |
| 4,807,970 | 2/1989 | Dube et al. | 350/3.64 |
| 4,877,297 | 10/1989 | Yeh | 350/3.64 |
| 4,948,212 | 8/1990 | Cheng et al. | 350/3.64 |

OTHER PUBLICATIONS

Sincerbox et al, "Opto-Optical Light Deflection," *Applied Optics*, vol. 22, No. 5, Mar. 1, 1983, pp. 690 to 697.
Leith et al, "Recording of Phase-Amplitude Images," *Applied Optics*, vol. 20, No. 17, Sep. 1, 1987, pp. 3081 to 3084.
Grousson et al, "White-Light Image Processing with LiNbO$_3$," *Applied Optics*, vol. 19, No. 11, Jun. 1980, pp. 1762 to 1767.

*Primary Examiner*—Rodney B. Bovernick
*Assistant Examiner*—Martin Lerner

[57] ABSTRACT

Achromatic volume holograms are attained for broad band phase conjugation and image reconstruction having bandwidths of 250 nanometers. The holograms are generated by means of a diffraction grating having a predetermined angle of tilt. Achromaticity is achieved by tilting the holographic recording medium at the same predetermined angle.

10 Claims, 3 Drawing Sheets

ACHROMATIC VOLUME HOLOGRAPHY APPARATUS

BACKGROUND OF THE INVENTION

Three dimensional representation of distant objects has heretofore been hampered by atmospheric effects. The resultant distortion of the reconstructed holograms seriously deters from use of such holograms for serious military applications under achromatic illumination.

Although achromatic "thin" holograms are commercially feasible and volume holograms can be produced under monochromatic illumination, such holograms appear distorted due to optical variations occurring within the various diffraction gratings used within the beam-splitter part of the optical system.

Some early attempts at compensating for such optical variations are described within the following U.S. Pat. Nos. 4,773,719 and 4,786,124 which Patents attempt to increase the diffraction efficiency of the respective diffraction gratings by complex electronic intervention.

It would be advantageous to provide achromatic volume holograms for both military and commercial applications without requiring complex and expensive electronic or optical equipment beyond the apparatus required to construct and record the hologram, per se.

One object of this invention accordingly, is to provide a simple and economical apparatus for developing and recording such achromatic volume holograms.

SUMMARY OF THE INVENTION

Achromatic volume holograms are provided by arranging a diffraction grating at a predetermined angle of tilt and arranging the recording medium at the same angle. Wide bandwidths and high diffraction efficiencies are thereby achieved.

DESCRIPTION OF THE PREFERRED EMBODIMENT

Figure 1:
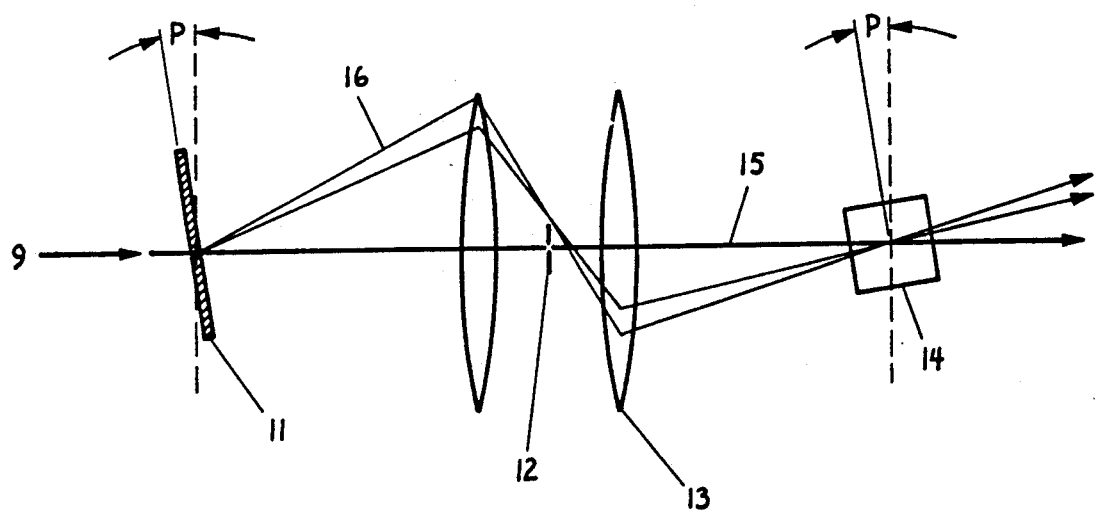
FIG. 1 is a diagrammatic representation of the achromatic volume holographic apparatus according to the invention.

The achromatic volume hologram apparatus 10 of FIG. 1 includes a fixed diffraction grating 11 tilted at a predetermined angle P which will be described below in some detail. An object 9 located at several miles distance from the grating is projected by means of a pair of telescoping lenses 13 onto the surface of a holographic recording medium 14 which can comprise a thick real time volume holographic recording medium such as barium titanate if real time representation is desired. Otherwise, holographic film material can be employed to store the image for subsequent reconstruction. A spatial filter 12 is placed between lenses 13 to produce a reference beam 15 for the hologram. The image information is carried on diffracted beams 16. In order to produce a distortion-free achromatic representation, the recording material is tilted at the same angle P with respect to the vertical plane.

It was determined that each of the diffracted beams interferes with the corresponding reference to provide a holographic fringe pattern with the same carrier frequency as the diffraction grating in the image plane as described in the paper entitled "Achromatic Volume Holography Using Dispersive Compensation for Grating Tilt" presented at the Electro-Optics Conference, Tufts University May 31, 1989, which paper is incorporated herein for reference purposes. When the recording medium is not tilted, the holographic fringes for each of the incident wavelengths become rapidly out of phase with each other within the recording medium, rendering most of the medium ineffective for recording. When the recording medium is tilted at the predetermined angle P, the fringes for a large range of wavelengths become in phase with each other through the volume of the recording medium, thus removing the distortion of the diffracted beams.

Figure 2:
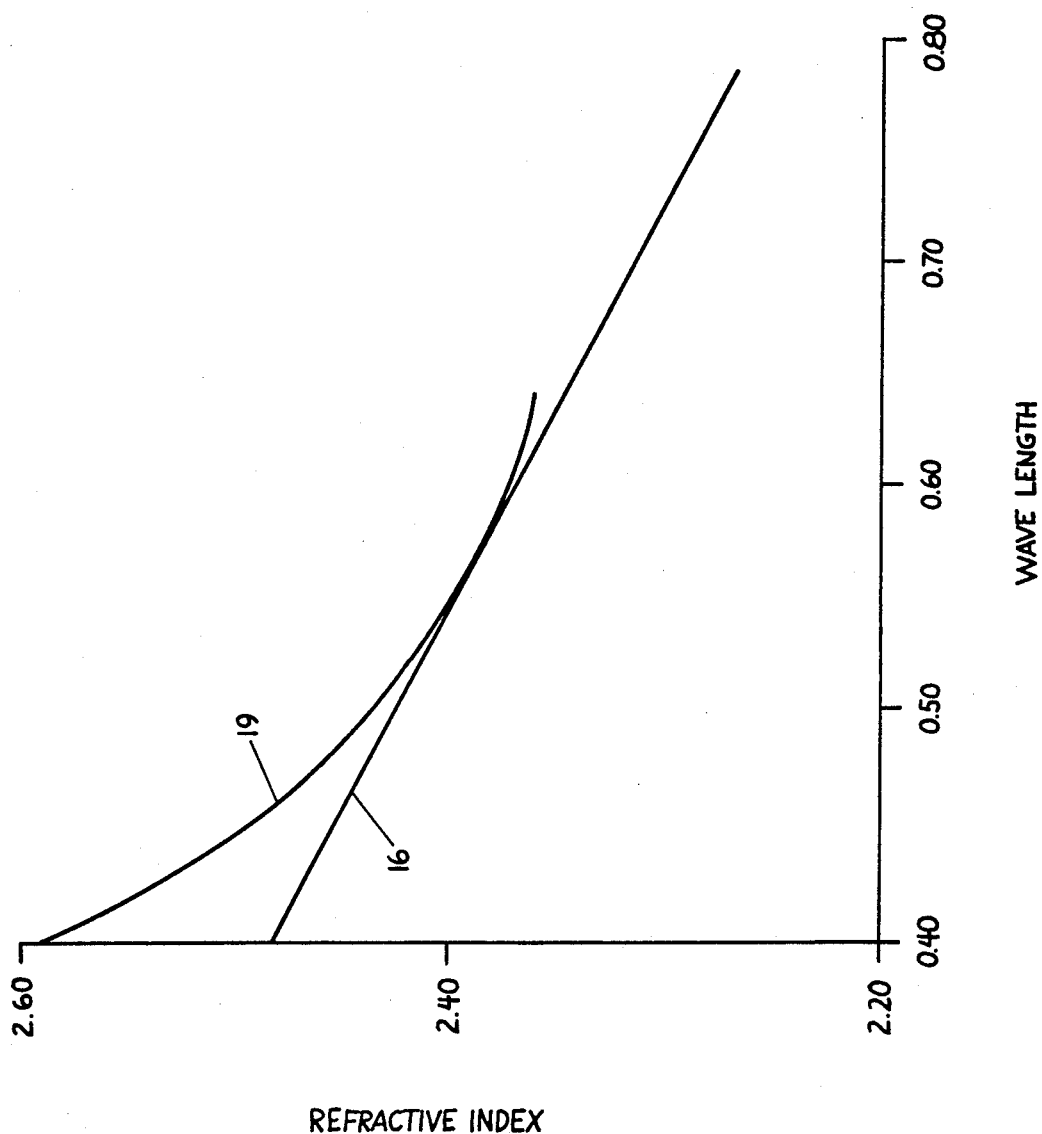
FIG. 2 is a graphic representation of the refractive index as a function of wavelength.

In order to determine the correct angle of tilt to provide optimum diffraction efficiency for achromatic holograms for a particular embodiment in which the center wavelength the light was 505 um, the fixed grating period was 10 um and the recording medium was barium titanate, the expression $P = (L \cdot n/n^1) 2d = 14^8$ is employed. In this expression n equals the refractive index of the crystal, n' equals the derivative of n with respect to L, L equals the wavelength of the optical image, and d equals the fixed period of the grating. The relation between the refractive index for the barium titanate crystal used as the diffraction grating is shown in FIG. 2 wherein the actual index depicted at 17 is compared to the ideal index 18.

With both the diffraction grating and the holographic recording medium comprising barium titanate crystals, the resultant volume hologram exhibited a bandwidth of 254 nm which heretofore was unattainable without requiring separate electronic implementation.

Figure 3:
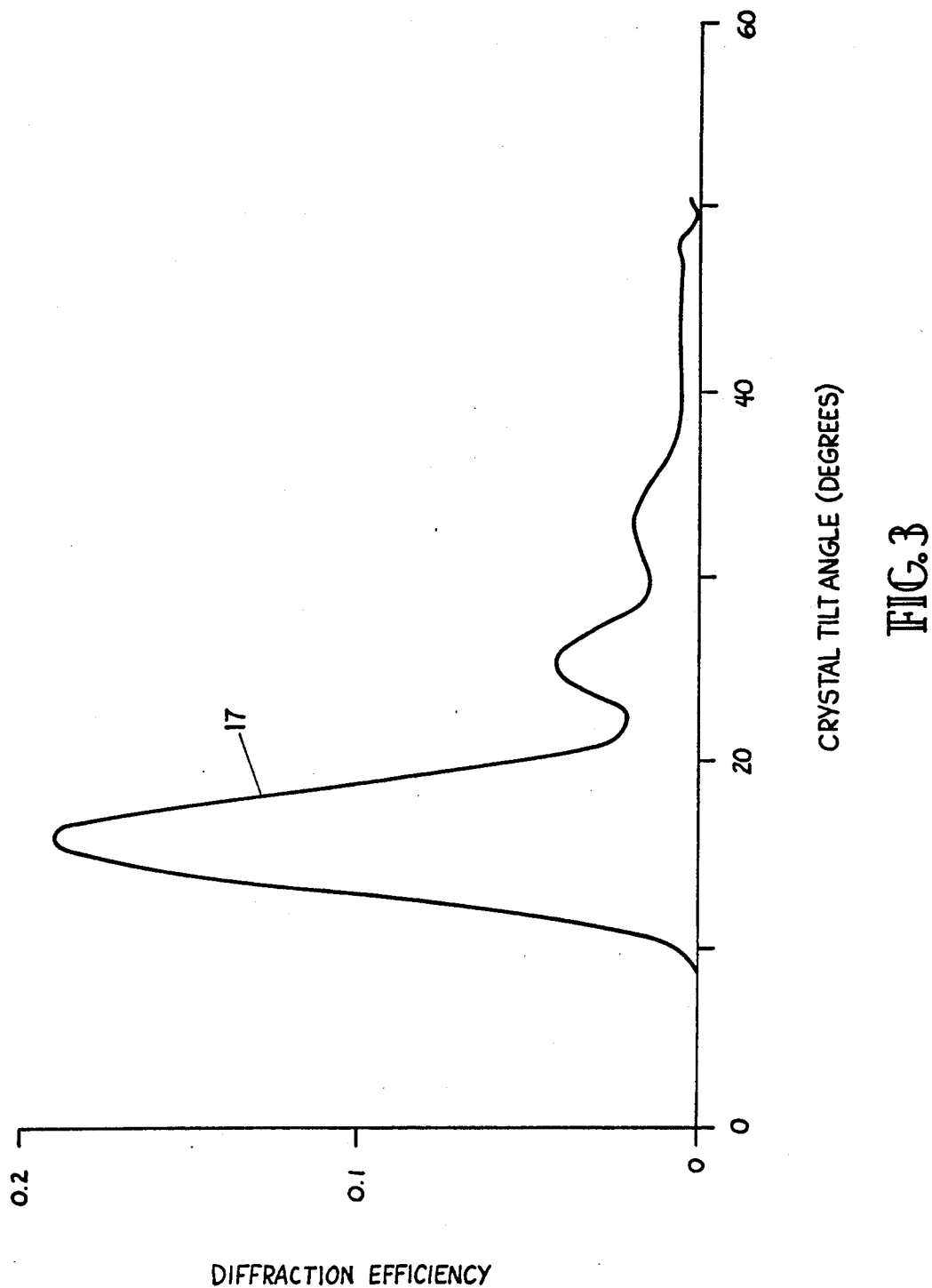
FIG. 3 is a graphic representation of the diffraction efficiency as a function of tilt angle.

For purposes of this disclosure, the factor of merit for determining the effectiveness of achromatic volume holographic generation is the diffraction efficiency of the tilted diffraction grating. The variation of the diffraction efficiency depicted at 19 as a function of the angle of tilt is shown in FIG. 3. The optimum angle being that given earlier for calculation the angle P as a function of the characteristics of the particular material selected for the photorefractive crystal used as the diffraction grating. Materials other than photorefractive crystals can also be used for both the beam-splitting diffraction grating as well as the recording medium. In some applications it may be preferable to use a non-linear optical material such as a gas which exhibits negligible dispersion. The non-linear optical material can be in the form of a wedge shaped to the optimum tilt angle and arranged such that the angle of incidence is the tilt angle and the interference fringes are normal to the exit surface of the wedge for optimum diffraction efficiency.

A simple and efficient apparatus has herein been described whereby achromatic volume holograms can be readily generated with minimum distortion and excellent image reproduction.

Having thus described our invention, what we claim as new and desire to secure by Letters Patent is:

1. Apparatus for providing an achromatic volume hologram comprising:
    a diffraction grating inclined at a predetermined angle from a horizontal plane and arranged for receiving an optical image;
    filter means optically coupled with said diffraction grating, said optical image transferring through said filter means;

holograph recording means inclined at said predetermined angle receiving said optical image and providing a holographic representation thereof; and telescope means intermediate said filter means and said holograph recording means transmitting said optical image to said holograph recording means.

2. The apparatus of claim 1 wherein said filter means comprises a spatial filter.

3. The apparatus of claim 1 wherein said hologram recording means comprises a photorefractive crystal.

4. The apparatus of claim 3 wherein said crystal comprises barium titanate.

5. The apparatus of claim 3 wherein said predetermined angle is derived from the expression: $P = (L - n/n^1)2d$ where n = refractive index of said crystal, $n^1$ = derivative of n with respect to L, L = wavelength of said optical image, and d = fixed period of said grating.

6. The apparatus of claim 1 wherein said diffraction grating comprises barium titanate.

7. The apparatus of claim 1 wherein said diffraction grating comprises a non-linear optical material.

8. The apparatus of claim 7 wherein said non-linear optical material comprises a gas.

9. The apparatus of claim 8 wherein said gas is contained within a transparent wedge-shaped configuration formed to said predetermined angle.

10. The apparatus of claim 1 wherein said diffraction grating comprises a wedge-shaped configuration formed to said predetermined angle.

* * * * *